United States Patent
Pradhan et al.

(10) Patent No.: US 10,496,822 B2
(45) Date of Patent: Dec. 3, 2019

(54) METHODS AND APPARATUS FOR SECURING A MOBILE DEVICE

(71) Applicant: McAfee, LLC, Plano, TX (US)

(72) Inventors: Arpit Pradhan, Plano, TX (US); Priyadarshini Rao Rajan, Santa Clara, CA (US); German Lancioni, San Jose, CA (US); Tamir Damian Munafo, Naale (IL)

(73) Assignee: McAfee, LLC, Santa Clara, CA (US)

( * ) Notice: Subject to any disclaimer, the term of this patent is extended or adjusted under 35 U.S.C. 154(b) by 162 days.

(21) Appl. No.: 15/851,424

(22) Filed: Dec. 21, 2017

(65) Prior Publication Data
US 2019/0197240 A1     Jun. 27, 2019

(51) Int. Cl.
*G06F 21/56* (2013.01)
*G06F 21/78* (2013.01)

(52) U.S. Cl.
CPC .......... *G06F 21/568* (2013.01); *G06F 21/565* (2013.01); *G06F 21/566* (2013.01); *G06F 21/567* (2013.01); *G06F 21/78* (2013.01); *G06F 2221/034* (2013.01)

(58) Field of Classification Search
CPC .... G06F 21/568; G06F 21/567; G06F 21/566; G06F 21/565
USPC .......................................................... 726/24
See application file for complete search history.

(56) References Cited

U.S. PATENT DOCUMENTS

| | | | | |
|---|---|---|---|---|
| 8,732,469 B2* | 5/2014 | Sakai | ..................... | G06F 21/33 709/223 |
| 9,360,834 B1* | 6/2016 | Payne | ................ | G03G 21/1867 |
| 2011/0029775 A1* | 2/2011 | Sakai | ..................... | G06F 21/33 713/171 |
| 2014/0106676 A1* | 4/2014 | Yarger | .............. | H04M 1/72527 455/41.2 |

(Continued)

FOREIGN PATENT DOCUMENTS

| CN | 205265775 | 5/2016 |
|---|---|---|
| KR | 20160022011 | 2/2016 |

OTHER PUBLICATIONS

International Searching Authority, "International Search Report and Written Opinion," issued in connection with International Application No. PCT/US2018/066282, dated Mar. 18, 2019, 12 pages.

*Primary Examiner* — Teshome Hailu
(74) *Attorney, Agent, or Firm* — Hanley Flight & Zimmerman, LLC (57) ABSTRACT

Methods, apparatus, systems, and articles of manufacture for securing a mobile device are disclosed. An example apparatus includes a housing dimensioned to receive the mobile device. A secure storage is carried by the housing. A malware scanner is carried by the housing, and is to perform a first scan of an external electronic device to detect malware. A driver loader is carried by the housing, and is to mount a secure file transfer driver in response to the first scan not identifying malware on the external electronic device. A file handler is carried by the housing, and is to detect, using the secure file transfer driver, a file to be transferred intermediate the external electronic device and the mobile device. The malware scanner is to scan the file. The file handler is to quarantine the file in response to the malware scanner detecting malware in the file.

35 Claims, 7 Drawing Sheets

(56) References Cited

U.S. PATENT DOCUMENTS

2014/0373147 A1* 12/2014 Seinfeld .................. G06F 21/56
726/23
2017/0262632 A1* 9/2017 Jaman ................... G06F 21/566

* cited by examiner

METHODS AND APPARATUS FOR SECURING A MOBILE DEVICE

FIELD OF THE DISCLOSURE

This disclosure relates generally to electronic security, and, more particularly, to methods and apparatus for securing a mobile device.

BACKGROUND

Mobile devices are rapidly overtaking desktop devices in the number of users. Research estimates that there will be more than six billion smartphone users by 2020. These mobile devices are replacing personal computers at home as well as in the workplace, and may be used for operations such as web surfing, e-commerce transactions, and online banking.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

In desktop computing systems, users are accustomed to utilizing antivirus and/or anti-malware software. In contrast, very few users utilize antivirus and/or anti-malware software on their mobile devices (e.g., smartphones, tablets, etc.). Indeed, because many users do not install and/or utilize antivirus and/or anti-malware software on their mobile devices, performing regular scans is not a common operation. As a result, malware attacks are rapidly increasing in mobile devices, as users are not aware of risks and are not taking precautionary measures to be protected.

Many mobile device accessories exist in the market such as, for example, battery packs, flash drives, camera triggers, etc. Such accessory devices provide different functionalities such as, for example, transferring data, extending battery life, etc. However, such devices are not equipped with any security infrastructure to deal with malware attacks. Such malware attacks may occur when connecting a mobile device to an infected external electronic device (e.g., desktop, a power charger, an accessory device, etc.). The malware infection then may be propagated from the mobile device to the connected external electronic device and/or from the connected external electronic device to the mobile device. For example, if a user were to utilize a public universal serial bus (USB) charging station at an airport, malware could propagate to the USB charging station, and such malware could, therefore, propagate to subsequent users who also connect their mobile device to the USB charging station.

Such propagation to other devices is a major concern to the mobile device ecosystem. As a result, securing the external devices with which mobile devices interact is then a top priority both in business and personal use.

Example approaches disclosed herein enable mobile device security by providing a hardware accessory that acts as an intermediary between a mobile device and an external electronic device (e.g., an accessory device, a charging station, another mobile device, a desktop computer, a flash drive, a memory card, etc.). Such intermediary hardware (which may be provided in different form factors or dimensions) enable many different makes and/or models of mobile devices to be protected from malware without requiring a manufacturer of a mobile device to include security and/or requiring a user to install security software.

Figure 1:
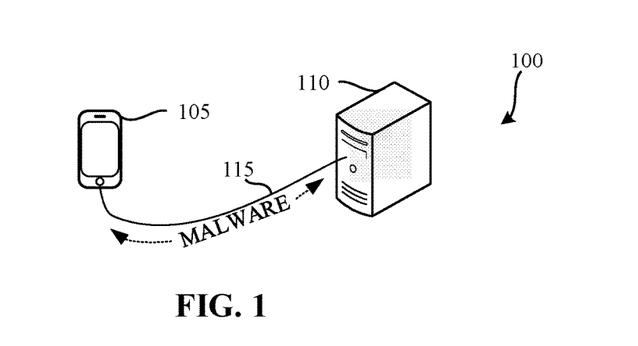
FIG. 1 is a diagram illustrating an example environment of use including a mobile device connected with an external electronic device.

FIG. 1 is a diagram illustrating an example environment of use 100 including a mobile device 105 connected with an external electronic device 110. In the illustrated example of FIG. 1, the mobile device 105 is connected with the external electronic device 110 via a wired connection 115. Malware may be transmitted via the connection 115, from the mobile device 105 to the external electronic device 110 and/or from the external electronic device 110 to the mobile device 105.

The mobile device 105 of the illustrated example of FIG. 1 is a smartphone. However, any other type of mobile device may additionally or alternatively be used such as, for example, a tablet, a smart watch, a wearable computing device, etc. In examples disclosed herein, the example mobile device 105 executes an operating system such as, for example, an Android operating system. However, any other operating system may additionally or alternatively be used such as, for example, an iOS operating system.

The external electronic device 110 of the illustrated example of FIG. 1 is a desktop computer. However, any other type of external electronic device may additionally or alternatively be used such as, for example, a laptop computer, a battery pack, a USB charging station, an accessory device, etc. In the illustrated example of FIG. 1, the external electronic device includes circuitry to enable the external electronic device to interact with the mobile device 105 via the connection 115. In some examples, such interaction does not involve data transfer between the mobile device and the external electronic device (e.g., the external electronic device may be a battery pack that provides power to the mobile device). In such examples, there is no risk of malware propagation, as no data is transferred between the devices. However, in some examples, the interaction may involve data transfer between the mobile device and the external electronic device to, for example, transfer a file from the external electronic device to the mobile device. In such examples, the file may include malware. As used herein, a file may include any information and/or data to be transferred intermediate the mobile device and the external electronic device. For example, the file may include instructions to be executed by the mobile device and/or the external electronic device, image data, user-identifying information, etc. In some examples, such data transfer is performed without the knowledge of the user. For example, the user may plug the mobile device into a USB charging station that silently (e.g., without alerting the user) transfers files (e.g., malware) to the mobile device.

Figure 2:
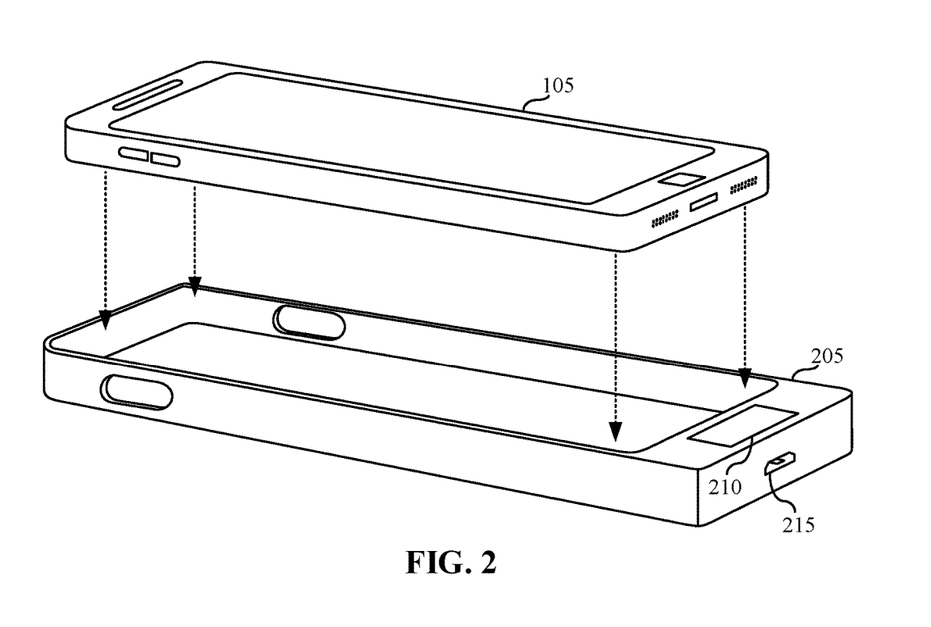
FIG. 2 illustrates an example housing constructed in accordance with the teachings of this disclosure and dimensioned to receive the mobile device of FIG. 1.

FIG. 2 illustrates an example housing 205 constructed in accordance with teachings of this disclosure. In the illustrated example of FIG. 2, the housing 205 is dimensioned to receive and at least partially surround the mobile device 105. In this example, the housing 205 is an accessory (e.g., a case) for the mobile device 105 that includes a security system 210. The security system 210 acts as an intermediary between the mobile device 105 and the external electronic device 110. As such, many different makes and/or models of mobile devices can be protected from malware without requiring a manufacturer of a mobile device to include security and/or requiring a user to install security software on the mobile device. The example housing 205 may be implemented using any appropriate dimensions and/or shapes to accommodate (e.g., at least partially house) any make, model, and/or form factor of mobile device 105.

In the illustrated example of FIG. 2, the housing 205 includes a connectivity port 215. The connectivity port 215 enables the security system 210 to communicate with the external electronic device 110 via, for example, a Universal Serial Bus (USB) connection. Any version of a USB connector may be used. Additionally or alternatively, any other type of connection and/or port may additionally or alternatively be used to enable communications between the security system 210 and the external electronic device 110.

Figure 3:
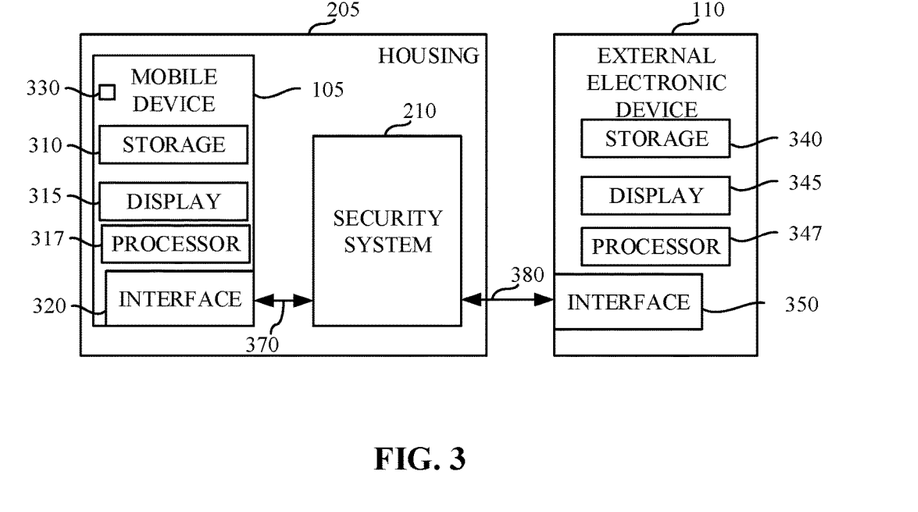
FIG. 3 is an example implementation of the housing of FIG. 2 including a security system for securing a mobile device.

FIG. 3 illustrates an example implementation of the housing 205 of FIG. 2. The example housing 205 of FIG. 3 includes a security system 210. Communications between the mobile device 105 and the external electronic device 110 pass through the security system 210.

In the example of FIG. 3, the mobile device 105 is shown positioned within the housing 205. The example mobile device 105 of the illustrated example of FIG. 3 includes storage 310, a display 315, a processor 317, and an interface 320. In some examples, the mobile device 105 implements a companion application 330.

The example storage 310 of the illustrated example of FIG. 3 is implemented by any memory (e.g., solid state memory), storage device and/or storage disc for storing data such as, for example, flash memory, magnetic media, optical media, etc. Furthermore, the data stored in the example storage 310 may be in any data format such as, for example, binary data, comma delimited data, tab delimited data, structured query language (SQL) structures, etc. While in the illustrated example the example storage 310 is illustrated as a single element, the example storage 310 and/or any other data storage elements described herein may be implemented by any number and/or type(s) of memories. In the illustrated example of FIG. 3, the example storage may store any type of data for use by the mobile device 105 (and/or for transfer to the external electronic device 110) including, for example, data files, operating system files, configuration files, executables, etc.

The example display 315 of the illustrated example of FIG. 3 is implemented by any display device capable of presenting information to a user from the mobile device 105. In some examples, the display device is a touchscreen graphical display. However, any other type of display may additionally or alternatively be used such as, for example, a light emitting diode (LED), an organic light emitting diode (OLED), a liquid crystal display, a cathode ray tube display (CRT), a tactile output device, etc.

The example processor 317 executes instructions at the mobile device 105 to, for example, implement an operating system, implement an application, etc. The example processor 317 is hardware and may be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)).

The example interface 320 of the illustrated example of FIG. 3 is implemented by a USB interface. However, any other past, present, and/or future type of interface may additionally or alternatively be used. Moreover, in some examples, the interface may be implemented by a wireless interface such as, for example, a Bluetooth interface, a Near Field Communication (NFC) interface, etc. In examples disclosed herein, the interface 350 enables the mobile device 105 to communicate with the security system 210.

In some examples, the mobile device 105 implements the companion application 330. The companion application 330 is an application (e.g., a program) that is executed at the mobile device 105 (e.g., executed by the processor 317). In some examples, the example companion application 330 facilitates operations of the security system 210. For example, the companion application 330 may enable the mobile device 105 to store files in a secure storage of the security system 210 and/or facilitate presentation of alerts (e.g., a prompt for user instruction) to a user of the mobile device 105. In some examples, the companion application 330 is used to control settings and/or operational parameters of the security system 210.

As noted above, the example external electronic device 110 may be implemented by any type of external electronic device such as, for example, a laptop computer, a battery pack, a USB charging station, a mobile device accessory, etc. In the illustrated example of FIG. 3, the external electronic device 110 is a desktop computer, and includes storage 340, a display 345, a processor 347, and an interface 350. However, any of such components may be omitted and/or other components may be used based on the intended use of the external electronic device. For example, an external battery pack may omit the storage 340 and the display 345, but instead include a battery.

In the illustrated example of FIG. 1, the external electronic device includes the interface 350 to enable the external electronic device to indirectly interact with the mobile device 105 via the second connection 380. In some examples, such interaction does not involve data transfer between the mobile device and the external electronic device (e.g., the external electronic device may be a battery pack that provides power to the mobile device). However, in some examples, the interaction may involve data transfer between the mobile device 105 and the external electronic device 110 to, for example, transfer a file (e.g., a file stored in the storage 340) from the external electronic device 110 via the security system 210 to the mobile device 105. In such examples, the file may include malware.

The example storage 340 of the illustrated example of FIG. 3 is implemented by any memory, storage device and/or storage disc for storing data such as, for example, flash memory, magnetic media, optical media, etc. Furthermore, the data stored in the example storage 340 may be in any data format such as, for example, binary data, comma delimited data, tab delimited data, structured query language (SQL) structures, etc. While in the illustrated example the example storage 340 is illustrated as a single element, the example storage 340 and/or any other data storage elements described herein may be implemented by any number and/or type(s) of memories. In the illustrated example of FIG. 3, the example storage may store any type of data for use by the external electronic device 110 (and/or for transfer to the mobile device 105) including, for example, data files, operating system files, configuration files, executables, etc.

The example display 345 of the illustrated example of FIG. 3 is implemented by any display device capable of presenting information from the external electronic device 110. In some examples, the display device is a graphical display. However, any other type of display may additionally or alternatively be used such as, for example, a light emitting diode (LED), an organic light emitting diode (OLED), a liquid crystal display, a cathode ray tube display (CRT), a touchscreen, a tactile output device, etc.

The example processor 347 executes instructions at the external electronic device 110 to, for example, implement an operating system, implement an application, etc. The example processor 347 is hardware and may be implemented by one or more analog or digital circuit(s), logic circuits, programmable processor(s), application specific integrated circuit(s) (ASIC(s)), programmable logic device (s) (PLD(s)) and/or field programmable logic device(s) (FPLD(s)).

The example interface 350 of the illustrated example of FIG. 3 is implemented by a USB interface. However, any other past, present, and/or future type of interface may additionally or alternatively be used. Moreover, in some examples, the interface may be implemented by a wireless interface such as, for example, a Bluetooth interface, a Near Field Communication (NFC) interface, etc. In examples disclosed herein, the interface 350 enables the external electronic device 110 to communicate with the security system 210.

In the illustrated example of FIG. 3, the first connection 370 is established between the interface 320 of the mobile device 105 and the security system 210. In examples disclosed herein, the first connection 370 is implemented by a universal serial bus USB connection. However, any other type of connection between the mobile device 105 and the security system 210 may additionally or alternatively be used such as, for example, a Bluetooth connection, a serial connection, etc.

In the illustrated example of FIG. 3, a second connection 380 is established between the external electronic device 110 and the security system 210. In examples disclosed herein, the second connection 380 is implemented via a USB connection. However, any other type of connection between the external electronic device 110 and the example security system 210 may additionally or alternatively be used such as, for example, a Bluetooth connection, a serial connection, a cellular connection, etc.

Figure 4:
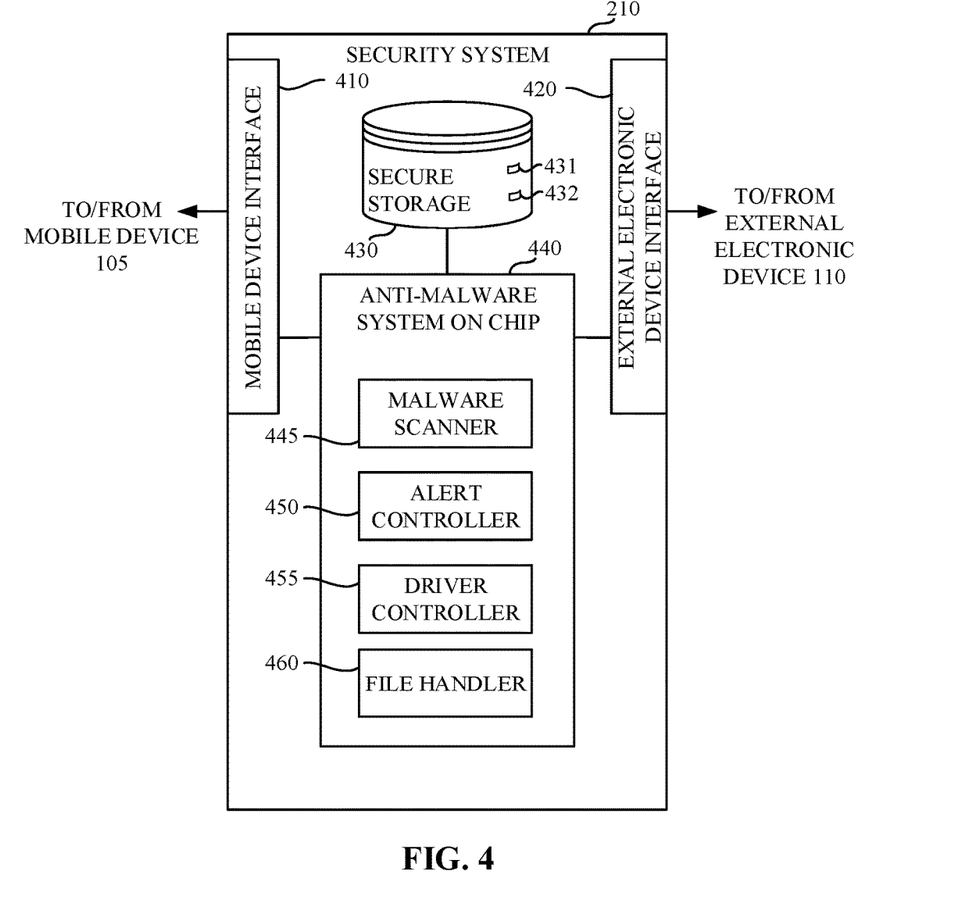
FIG. 4 is a block diagram illustrating an example implementation of the example security system of FIG. 3.

FIG. 4 illustrates an example implementation of the example security system 210 of FIGS. 2 and/or 3. The example security system 210 includes a mobile device interface 410, an external electronic device interface 420, a secure storage 430, and an anti-malware system-on-a-chip 440. The example mobile device interface 410 enables the security system 210 to communicate with the mobile device 105 of FIG. 1. Likewise, the example external electronic device interface 420 enables the security system 210 to communicate with the external electronic device 110 of FIG. 1. Such communications are processed by the anti-malware system-on-a-chip 440 before being passed to their destination (e.g., the anti-malware system-on-a-chip serves as a man in the middle, policing communications between the mobile device and the external electronic device). In the illustrated example of FIG. 4, the anti-malware system-on-a-chip 440 includes a malware scanner 445, an alert controller 450, a driver controller 455, and a file handler 460.

The example mobile device interface 410 of the illustrated example of FIG. 4 is implemented by a USB On-The-Go (OTG) controller. The OTG controller 410 facilitates communications with the mobile device 105. However, any other past, present, and/or future type of interface may be used to facilitate communications between the security system 210 and the mobile device 105 such as, for example, a Bluetooth interface, a serial interface, a WiFi interface, an Ethernet interface, etc.

The example external electronic device interface 420 of the illustrated example of FIG. 4 is implemented by a USB On-The-Go (OTG) controller. The second OTG controller 420 facilitates communications with the external electronic device 110. However, any other past, present, and/or future type of interface may be used to facilitate communications between the security system 210 and the external electronic device 110 such as, for example, a Bluetooth interface, a serial interface, a WiFi interface, an Ethernet interface, etc.

The example secure storage 430 of the illustrated example of FIG. 4 is implemented by any memory, storage device and/or storage disc for storing data such as, for example, flash memory, magnetic media, optical media, etc. Furthermore, the data stored in the example storage 340 may be in any data format such as, for example, binary data, comma delimited data, tab delimited data, structured query language (SQL) structures, etc. While in the illustrated example the example storage 340 is illustrated as a single element, the example secure storage 430 and/or any other data storage elements described herein may be implemented by any number and/or type(s) of memories.

In the illustrated example of FIG. 4, the example secure storage 430 may store any type of data for use by the security system 210 including, for example, data files, operating system files, configuration files, malware rules, quarantined files, executables, etc. in examples disclosed herein, the example anti-malware system-on-a-chip 440 stores temporary files that are to be transmitted from the mobile device 105 to the external electronic device 110 and/or from the external electronic device 110 to the mobile device. While stored in the example secure storage 430 such files can be safely processed by the example malware scanner 445 to determine whether such files include malware.

In some examples, the secure storage 430 can be accessed from the mobile device and/or from the external electronic device via the anti-malware system-on-a-chip 440. In such examples, access to the secure storage 430 is protected by the anti-malware system-on-a-chip 440. In examples disclosed herein, data stored in the secure storage 430 is encrypted and password protected. Thus, the user may store sensitive files in the secure storage 430 to protect such sensitive files from malware operating on the mobile device 105 and/or on the external electronic device 110. In some examples, accessing the file stored on the secure storage 430 requires authorization for each access, making accessing such files difficult for malware to accomplish. In some examples, access to such files is performed through a companion application executed by the mobile device 105 (e.g., the companion application 330) and/or the external electronic device 110. In some examples, the companion application 330 may be implemented by security service, an application, a software development kit (SDK), an application programming interface (API), etc.

The example malware scanner 445 of the illustrated example of FIG. 4 is implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). In examples disclosed herein, the example malware scanner 445 performs scans of the mobile device 105 and/or of the external electronic device 110. In some examples, the scans of the mobile device 105 are implemented using a debug connection such as, for example, an Android Debug Bridge (ADB).

In some examples, scans of the external electronic device 110 are implemented using an Environment Sanitization Driver (ESD) 431 that is loaded on the external electronic device. In examples disclosed herein, the ESD is stored in the secure storage 430. In examples disclosed herein, the ESD includes instructions that enable the malware scanner 445 to perform and/or initiate a scan of the external electronic device 110. In examples disclosed herein, the environment scan is a lightweight scan that aims to detect malware within memory of the external electronic device 110 (e.g., running processes are scanned). In some examples, temporal file locations that may be involved during communications between the mobile device 105 and the external electronic device 110 may additionally or alternatively be scanned. In examples disclosed herein, the scan may be performed based on malware signatures and/or other malware detection information stored in the secure storage 430. As used herein, malware is any data that can be used to interfere with operation of a device. In some examples, the malware may be malicious, and be intended to exfiltrate user information (e.g., social security information, usernames, passwords, personal information, etc.). As used herein, malware signatures include any information that may be used to detect malware such as, for example, patterns of data that are known to be malicious, uniform resource locators (URLs) known to be malicious, etc. From time to time, the malware signatures and/or other malware detection information stored in the secure storage 430 may be updated by, for example, communicating with an external server via the mobile device 105. Using the results of the scan, the example malware scanner 445 may determine whether the external electronic device 110 is clean, and may enable and/or disable further interactions with the external electronic device 110. If the example external electronic device 110 is clean, the ESD may be dismounted, and a secure file transfer driver 432 may be mounted by the driver controller 455. In examples disclosed herein, the secure file transfer driver 432 is stored in the secure storage 430.

In some examples, in addition to scanning the external electronic device 420, the example malware scanner 445 may perform a malware scan of the mobile device 105. Such scan may be performed periodically (e.g., every day, every week, etc.) and/or a-periodically (e.g., upon connection of the external electronic device 110, at the request of a user). In examples disclosed herein, the malware scan may be performed using an Android Debug Bridge (ADB) to interact with files stored in the storage 310 of the mobile device 105 and/or with processes executed by the processor 317 of the mobile device 105.

With the secure file transfer driver mounted, the example file handler 460 stores files to be transmitted between the mobile device 105 and the external electronic device 110 in the secure storage 430. The example malware scanner 445 scans the file stored in the secured storage 430 for malware. In examples disclosed herein, the malware scan is performed using malware signatures and/or other malware detection information stored in the secure storage 430. The example malware scanner 445 determines whether any malware is detected in the file as a result of the scan, and provides the result of the scan to the file handler 460 and/or the alert controller 450 to facilitate subsequent transmission, quarantine, and/or deletion of the file.

The example alert controller 450 of the illustrated example of FIG. 4 is implemented by one or more analog or digital circuit(s), logic circuits, programmable processor(s), ASIC(s), PLD(s), and or FPLD(s). The example alert controller 450 of FIG. 4 enables alerts to be presented via the example mobile device 105 and/or the example external electronic device 110. In some examples, the alert controller 450 causes an alert message to be displayed via the display 315 of the example mobile device. Example alerts may be displayed by, for example, displaying a notification message, a pop-up, etc. In some examples, the alert controller 450 causes the alert message to be displayed via the display 345 of the example external electronic device 110. For example, if the external electronic device 110 was implemented using a desktop computer, a pop-up window may be displayed via the display 345 to notify the user that a transmission of malware between the mobile device 105 and the external electronic device 110 was attempted. In some examples, the alert controller 450 receives a response via the alert presented to the user (e.g., via the mobile device 105 and/or via the external electronic device 110). Such a response may be used to, for example determine how to handle a file where malware is detected (e.g., accept the file, delete the file, terminate the connection between the external electronic device 110 and the mobile device 105, take no action, etc.) In some examples, the alert controller 450 interacts with the companion application 330 to facilitate presentation of alerts via the mobile device 105, and/or receive responses to those alerts from the mobile device 105.

The example driver controller 455 of the illustrated example of FIG. 4 is implemented by one or more analog or digital circuit(s), logic circuits, programmable processor(s), ASIC(s), PLD(s), and or FPLD(s). In examples disclosed herein, the driver controller 455 controls mounting and/or dismounting of drivers on the external electronic device 110. Such drivers may include, for example the environment sanitization driver ESD, and/or a secure file transfer driver. In examples disclosed herein, the ESD is first mounted to facilitate a scan of the external electronic device for malware. Once the scan is complete, the ESD is dismounted, and the secure file transfer driver is mounted, thereby enabling files transmitted intermediates of the external electronic device 110 and the mobile device 105 to be scanned by the anti-malware system-on-a-chip 440. In some examples, such an approach is referred to as a dual-driver approach and/or two-stage driver approach.

In some examples, the driver controller 455 checks if a driver (e.g., the ESD) is present in the external electronic device. In examples disclosed herein, the example driver controller 455 determines whether the driver is present on the external electronic device 110 by attempting to initialize the driver and/or interact with the driver. If the driver cannot be initialized and/or interacted with, the example driver controller 455 assumes that the driver is not present in the external electronic device 110. If the example driver is not present in the external electronic device 110, the example driver controller 455 determines whether auto-loading of a driver is enabled by the external electronic device 110. If autoloading of the driver is enabled by the external electronic device 110, the example driver controller 455 attempts installation of the driver on the external electronic device 110. In some examples, the determination of whether auto-loading of a driver is enabled by the external electronic device 110 is implemented by attempting to auto-load the driver and detecting whether the driver becomes installed.

The example file handler 460 of the illustrated example of FIG. 4 is implemented by one or more analog or digital circuit(s), logic circuits, programmable processor(s), ASIC(s), PLD(s), and or FPLD(s). The example file handler 460 monitors communications between the mobile device 105 and the external electronic device 110 to detect a file transfer. Upon detection of a file transfer between the mobile device 105 and the external electronic device 110 (in either direction), the example file handler 460 stores the file to be transferred in the secure storage 430. When the example file handler 460 stores a file in the secure storage 430, that file is not immediately transferred to its final destination (e.g., the mobile device 105 or the external electronic device 110). As noted above, the example malware scanner 445 first scans the file stored in the secured storage 430 for malware. If no malware is detected, the example file handler 460 transfers the file to its destination (e.g., via the mobile device interface 410 or the external electronic device interface 420, depending on the destination). The example file handler 460 then removes the file from the secure storage 430 to free up space for subsequent files to be transferred between the mobile device 105 and the external electronic device 110. If malware is detected, the file is quarantined in the secure storage 430. Subsequent operations may then be taken based on user input. For example, the file handler 460 may delete the file, the file handler 460 may complete the transfer of the file to the destination, etc.

In some examples, the example malware scanner 445, the example alert controller 450, the example driver controller 455, and/or the example file handler 460 are implemented using a same processor and/or other logic circuit.

Figure 5:
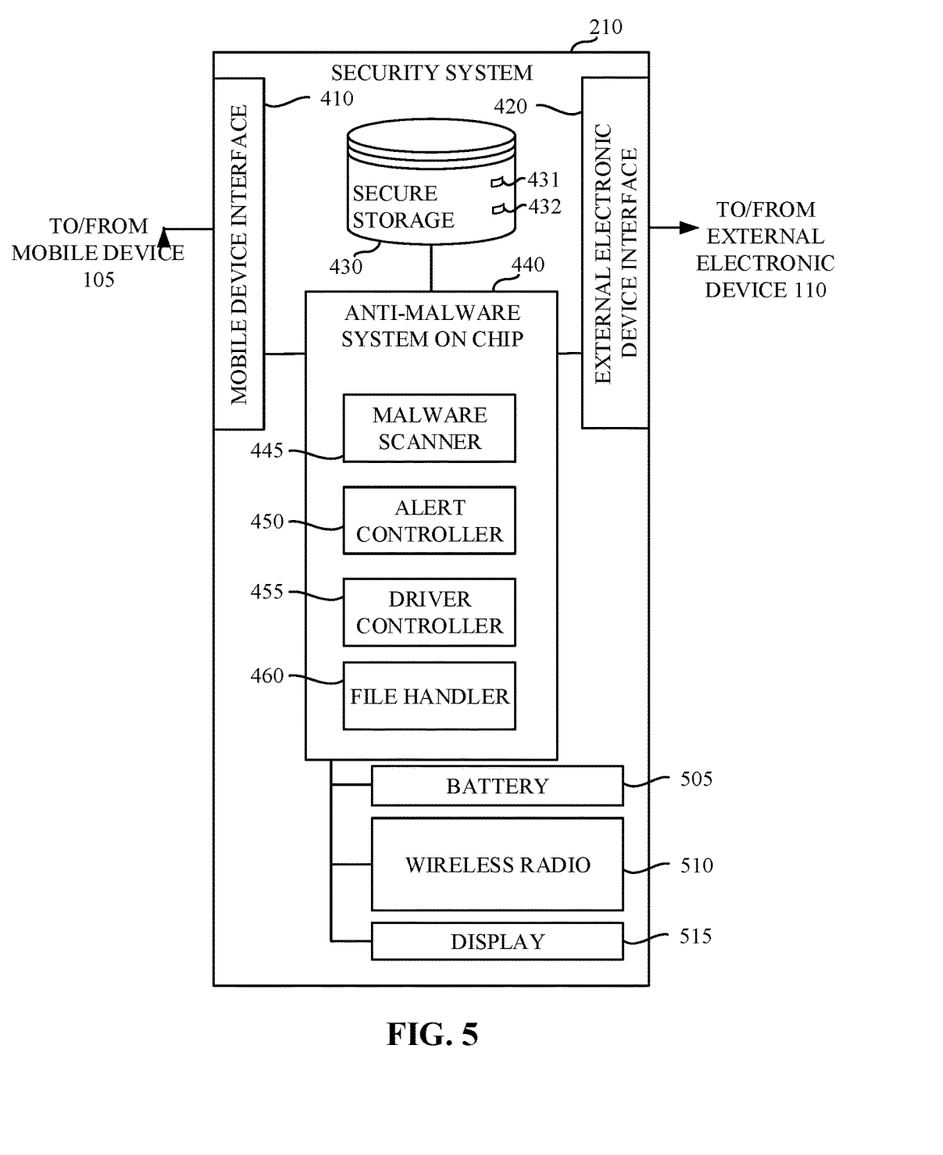
FIG. 5 is a block diagram illustrating an alternative example implementation of the example security system of FIG. 3.

FIG. 5 illustrates an alternative example implementation of the example security system 210 of FIGS. 2 and/or 3. In addition to the example mobile device interface 410, the example external electronic device interface 420, the example secure storage 430, and the example anti-malware system-on-a-chip 440 shown in FIG. 4, the example security system 210 of FIG. 5 includes a battery 505, a wireless radio 510, and a display 515. Such additional elements may provide additional functionality for the security system 210.

The example battery 505 of the illustrated example of FIG. 5 is implemented by any power storage circuitry (e.g., a super capacitor, a lithium-ion battery, etc.) that provides power for the security system 210 (as opposed to the security system 210 drawing power from the mobile device 105 and/or the external electronic device 110). In some examples, the battery 505 may be used to supplement the power of the mobile device 105. That is, the example battery 505, when included as part of the security system 210, may be used to charge a battery of the mobile device 105 and/or otherwise provide power to the mobile device 105.

The example wireless radio 510 is implemented by a transceiver that enables the anti-malware system-on-a-chip 440 to communicate with other devices (e.g., other external electronic devices, other mobile devices, network-connected devices, servers, etc.) In some examples, the wireless radio 510 is implemented using a near field communication (NFC) radio to enable the security system 210 to communicate with other near field communication devices (e.g., payment systems, door-lock systems, etc.) However, the example wireless radio 510 may be implemented using any other past, present, and/or future type of wireless transceiver such as, for example, a cellular transceiver, a Bluetooth transceiver, etc.

The example display 515 of the illustrated example of FIG. 5 is implemented using a liquid crystal display (LCD). However, any other past, present, and/or future display technology may additionally or alternatively be used. In examples disclosed herein, the example display 515 enables the security system 210 to present an alert to the user. Such an alert may be used, for example, to identify to the user that the malware scan of the external electronic device 410 has passed or failed, to identify to the user that a file which was to be transferred between the external electronic device 110 and the mobile device 105 includes malware, etc. In some examples, the display 515 may be a touchscreen and, thus, include user input receiving capabilities to, for example, receive an input from the user indicating an action to be taken in response to detection of malware in a file intermediate the mobile device 105 and the external electronic device 110.

While an example manner of implementing the example security system 210 of FIG. 2 is illustrated in FIGS. 4 and/or 5, one or more of the elements, processes and/or devices illustrated in FIGS. 4 and/or 5 may be combined, divided, re-arranged, omitted, eliminated and/or implemented in any other way. Further, the example mobile device interface 410, the example external electronic device interface 420, the example secure storage 430, the example anti-malware system-on-a-chip 440, the example malware scanner 445, the example alert controller 450, the example driver controller 455, the example file handler 460, and/or, more generally, the example security system 210 of FIGS. 2, 3, 4, and/or 5 may be implemented by hardware, software, firmware and/or any combination of hardware, software and/or firmware. Thus, for example, any of the example mobile device interface 410, the example external electronic device interface 420, the example secure storage 430, the example anti-malware system-on-a-chip 440, the example malware scanner 445, the example alert controller 450, the example driver controller 455, the example file handler 460, and/or, more generally, the example security system 210 of FIGS. 2, 3, 4, and/or 5 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example mobile device interface 410, the example external electronic device interface 420, the example secure storage 430, the example anti-malware system-on-a-chip 440, the example malware scanner 445, the example alert controller 450, the example driver controller 455, the example file handler 460, and/or, more generally, the example security system 210 of FIGS. 2, 3, 4, and/or 5 is/are hereby expressly defined to include a non-transitory computer readable storage device or storage disk such as a memory, a digital versatile disk (DVD), a compact disk (CD), a Blu-ray disk, etc. including the software and/or firmware. Further still, the example security system 210 of FIGS. 2, 3, 4, and/or 5 may include one or more elements, processes and/or devices in addition to, or instead of, those illustrated in FIGS. 2, 3, 4, and/or 5, and/or may include more than one of any or all of the illustrated elements, processes, and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 6:
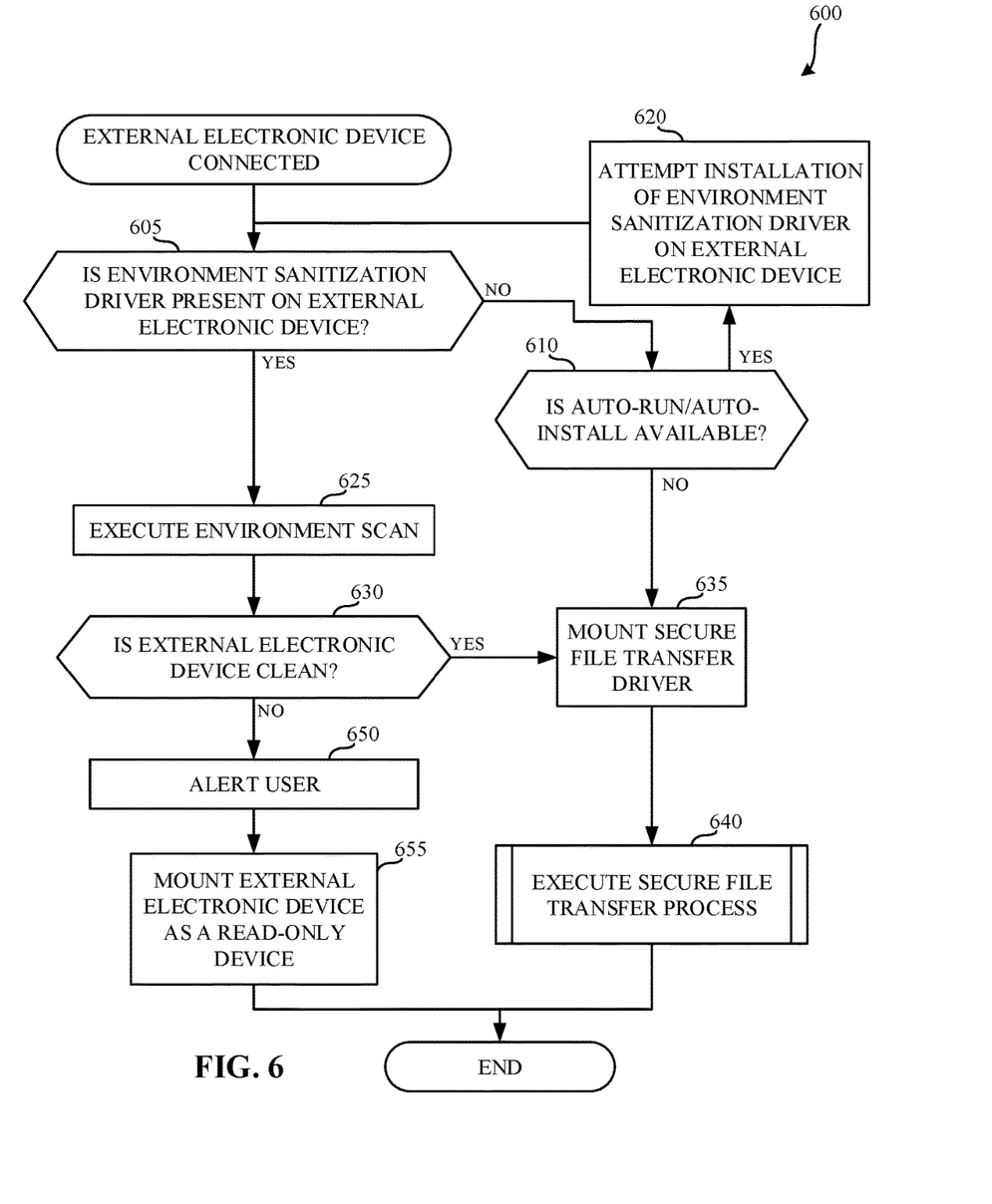
FIG. 6 is a flowchart representative of machine readable instructions which may be executed to implement the example security system of FIGS. 3, 4, and/or 5 to initialize a connection between a mobile device and an external electronic device.
Figure 7:
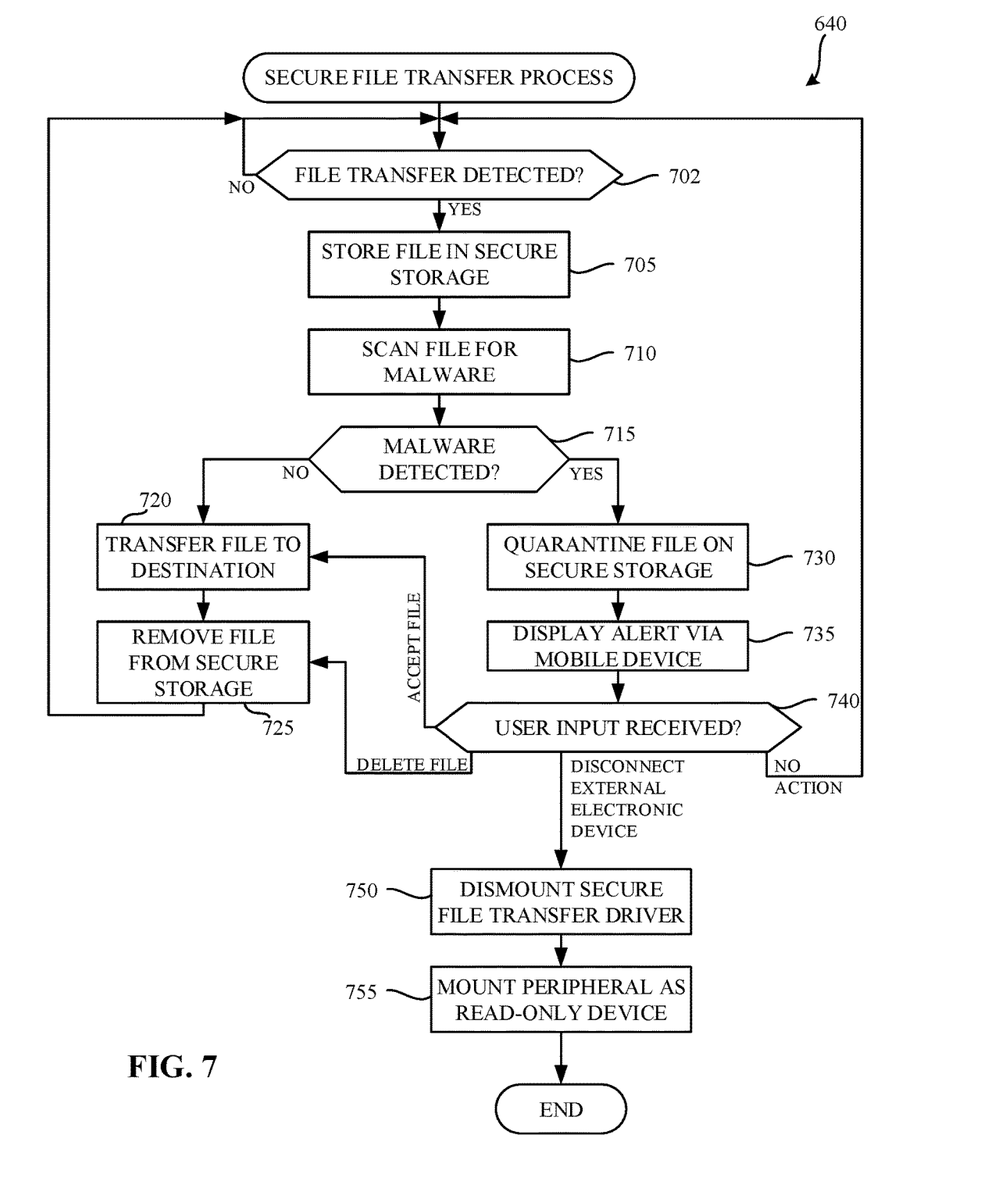
FIG. 7 is a flowchart representative of example machine readable instructions which may be executed to implement the example security system of FIGS. 3, 4, and/or 5 to execute a secure file transfer process intermediate a mobile device and an external electronic device.

Flowcharts representative of example machine readable instructions for implementing the example security system 210 of FIGS. 2, 3, 4, and/or 5 are shown in FIGS. 6 and/or 7. In these examples, the machine readable instructions comprise a program(s) for execution by a processor such as the processor 812 shown in the example processor platform 800 discussed below in connection with FIG. 8. The program may be embodied in software stored on a non-transitory computer readable storage medium such as a CD-ROM, a floppy disk, a hard drive, a digital versatile disk (DVD), a Blu-ray disk, or a memory associated with the processor 812, but the entire program and/or parts thereof could alternatively be executed by a device other than the processor 812 and/or embodied in firmware or dedicated hardware. Further, although the example program is described with reference to the flowchart(s) illustrated in FIGS. 6 and/or 7, many other methods of implementing the example security system 210 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIGS. 6 and/or 7 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended.

FIG. 6 is a flowchart representative of example machine readable instructions which may be executed to implement the example security system of FIGS. 3, 4, and/or 5 to initialize a connection between a mobile device and an external electronic device. The example program 600 of FIG. 6 begins when the example anti-malware system on chip 440 detects that an external electronic device has been connected via the external electronic device interface 420. The example driver controller 455 checks if an Environment Sanitization Driver (ESD) is present in the external electronic device. (Block 605). In examples disclosed herein, the example driver controller 455 determines whether the ESD is present on the external electronic device 110 by attempting to initialize the ESD and/or interact with the ESD. If the ESD cannot be initialized and/or interacted with, the example driver controller 455 assumes that the ESD is not present in the external electronic device 110. If the example ESD is not present in the external electronic device 110 (e.g., block 605 returns a result of NO), the example driver controller 455 determines whether auto-loading of a driver is enabled by the external electronic device 110. (Block 610). If autoloading of the driver is enabled by the external electronic device 110 (e.g., block 610 returns a result of YES), the example driver controller 455 attempts installation of the ESD on the external electronic device 110. (Block 620). In some examples, the determination of whether auto-loading of a driver is enabled by the external electronic device 110 is implemented by attempting to auto-load the ESD and detecting whether the ESD becomes installed. Control then returns to block 605, where the example driver controller 455 determines whether the environment sanitization driver is present on the external electronic device 110.

With the example environment sanitization driver present on the external electronic device, (e.g., when block 605 returns a result of YES), the example malware scanner 455 executes an environment scan on the external electronic device. (Block 625). In examples disclosed herein, the environment scan is performed by interacting with the ESD on the external electronic device 110. In examples disclosed herein, the environment scan is a lightweight scan that aims to detect malware within memory of the external electronic device 110 (e.g., running processes are scanned). In some examples, temporal file locations that may be involved during communications between the mobile device 105 and the external electronic device 110 may additionally or alternatively be scanned. In examples disclosed herein, the scan may be performed based on malware signatures and/or other malware detection information stored in the secure storage 430. From time to time, the malware signatures and/or other malware detection information stored in the secure storage 430 may be updated by, for example, communicating with an external server via the mobile device 105.

Using the results of the malware scan, the example malware scanner 455 determines whether the external electronic device 110 is clean. (Block 630). In some examples, the example malware scanner 445 may identify the external electronic device 110 as clean when no critical security threats are detected. However, in some examples, the example malware scanner 445 may identify the external electronic device 110 as clean when no security threats (of any level of severity) are detected. If the example malware scanner 455 determines that the external electronic device 110 is clean (e.g., block 630 returns a result of YES), the example driver controller mounts a secure file transfer driver in the external electronic device 110. (Block 635). In some examples, the ESD is dismounted prior to mounting of the secure file transfer driver.

In the illustrated example of FIG. 6, the secure file transfer driver may also be mounted by the driver controller 455 in response to the driver controller 455 determining that the environment sanitization driver is not present on the external electronic device (e.g., in response to block 605 returning result of NO) and the driver controller 455 determining that AutoRun and/or auto installation of drivers is not available on the external electronic device 110 (e.g., block 610 returns a result of NO). Such an approach ensures that connectivity between the mobile device 105 and the external electronic device 110 is maintained even when the environment sanitization driver is not present or cannot be installed automatically on the external electronic device 110 to facilitate the environment scan of block 625. However, in some examples, if the ESD cannot be installed and/or is not present on the external electronic device 110, the secure file transfer driver may not be mounted.

Once the example secure file transfer driver is mounted (e.g., block 635 is completed), the example anti-malware system on chip 440 executes a secure file transfer process to facilitate file transfers between the mobile device 105 and the external electronic device 110. (Block 640). An example approach to executing secure file transfer process between the mobile device 105 in the external electronic device 110 is disclosed in further detail in connection with FIG. 7.

Returning to block 630, if the external electronic device system is not clean (e.g., block 630 returns a result of NO), the example alert controller 450 alerts the user of the mobile device. (Block 650). In examples disclosed herein, the alert is displayed in a pop-up message that is displayed via the mobile device 105. However, any other approach to alerting the user may additionally or alternatively be used. For example, the alert may be displayed via the companion application 330 of the mobile device 105. The example driver controller 455 mounts the external electronic device 110 as a read-only device. (Block 655). The example connection process then terminates.

FIG. 7 is a flowchart representative of example machine readable instructions 700 which may be executed to implement the example security system of FIGS. 3, 4, and/or 5 to execute a secure file transfer process intermediate the mobile device 105 and the external electronic device 110. The example program 640 of FIG. 7 begins when the example secure file transfer driver is loaded via block 635 of FIG. 6. The example file handler 460 monitors communications between the mobile device 105 and the external electronic device 110 to detect a file transfer. (Block 702). If no file transfer is detected, the example file handler 460 continues to monitor for a file transfer. In some examples, the external electronic device 110 and/or the mobile device 105 may become disconnected from the security system 305. In such an example, the example process 640 of FIG. 7 may be terminated.

Upon detection of a file transfer between the mobile device 105 and the external electronic device 110 (e.g., block 702 returning result of YES), the example file handler 460 stores the file to be transferred in the secure storage 430. (Block 705). When the example file handler 460 stores a file in the secure storage 430, that file is not transferred to its final destination (e.g., the mobile device 105 or the external electronic device 110). The example malware scanner 445 scans the file stored in the secured storage 430 for malware. (Block 710). In examples disclosed herein, the malware scan is performed using malware signatures and/or other malware detection information stored in the secure storage 430. The example malware scanner 445 determines whether any malware is detected in the file as a result of the scan. (Block 715). If no malware is detected (e.g., block 715 returns a result of NO), the example file handler 460 transfers the file to its destination (e.g., via the mobile device interface 410 or the external electronic device interface 420). (Block 720). The example file handler 460 removes the file from the secure storage 430. (Block 725). Removing the file from the secure storage frees up space for subsequent files to be transferred between the mobile device 105 and the external electronic device 110.

In some examples, the files stored in the secure storage 430 are maintained until the connection between the mobile device 105 and the external electronic device 110 is terminated, and/or until additional storage space is required for subsequent files to be transferred. In some examples, the files may be deleted by the file handler 460 upon initialization (e.g., power-up of the security system 305) to remove any prior temporary files stored in the secure storage 430 that had been transferred between the mobile device 105 and a prior external electronic device. Control then returns to block 702, where the example file handler 460 detects a subsequent file transfer for processing.

Returning to block 715, if the example malware scanner 445 determines that malware is been detected within the file on the secure storage 430 (e.g., block 715 returns a result of YES), the example malware scanner 445 quarantines the file on the secure storage. (Block 730). The example alert controller 450 then displays an alert via the mobile device. (Block 735). In examples disclosed herein, the alert informs the user of the mobile device 105 that malware was detected during a file transfer between the mobile device 105 and the external electronic device 110. In examples disclosed herein, the alert prompts the user for input on how to proceed. The alert controller 450 receives the user input and takes an appropriate action based on the user input. (Block 740).

In some examples, the user may instruct the security system 305 to accept the file transfer between the mobile device and the external electronic device. In such an example, control proceeds to block 720 where the file handler 460 transfers the file to the destination. (Block 720). The file may then be removed from secure storage (block 725) and subsequent file transfers may continue to be monitored block 702.

In some examples, the user may instruct security system to delete the file. In such an example, control proceeds to block 725, where the example file handler 460 removes the file from the secure storage 430. (Block 725). Control then proceeds to block 702 where subsequent file transfers may continue to be monitored.

In some examples, the user may instruct the security system 305 to disable file transfers between the mobile device 105 and the external electronic device 110. Such an option may be utilized when, for example, file transfers are initiated without the knowledge of the user. In such an example, the driver controller 455 dismounts the security file transfer driver. (Block 750). In the illustrated example of FIG. 7, the example driver controller 455 then mounts the external electronic device as a read-only device. (Block 755). Mounting the external electronic device 110 as a read-only device ensures that other functionality is maintained (e.g., playing a video file on the mobile device 105 that is stored on the external electronic device 110). In some examples, the connectivity between the mobile device 105 and the external electronic device 110 may be terminated. As the secure file transfer driver is dismounted and/or disabled in block 750, control does not proceed back to block 702, and the example process 640 of the illustrated example of FIG. 7 is terminated.

In some examples, the user may instruct the security system 305 to take no action with respect to the quarantined file. In such an example, control proceeds to block 702 where the file handler 460 continues to monitor for subsequent file transfers. In some examples, this option may be selected automatically after a threshold amount of time has elapsed since the presentation of the alert via the mobile device (e.g., since execution of block 735). In some examples, users may later review files that had been quarantined on the secure storage 430 to accept their transfer and/or delete the file from the secure storage 430.

Figure 8:
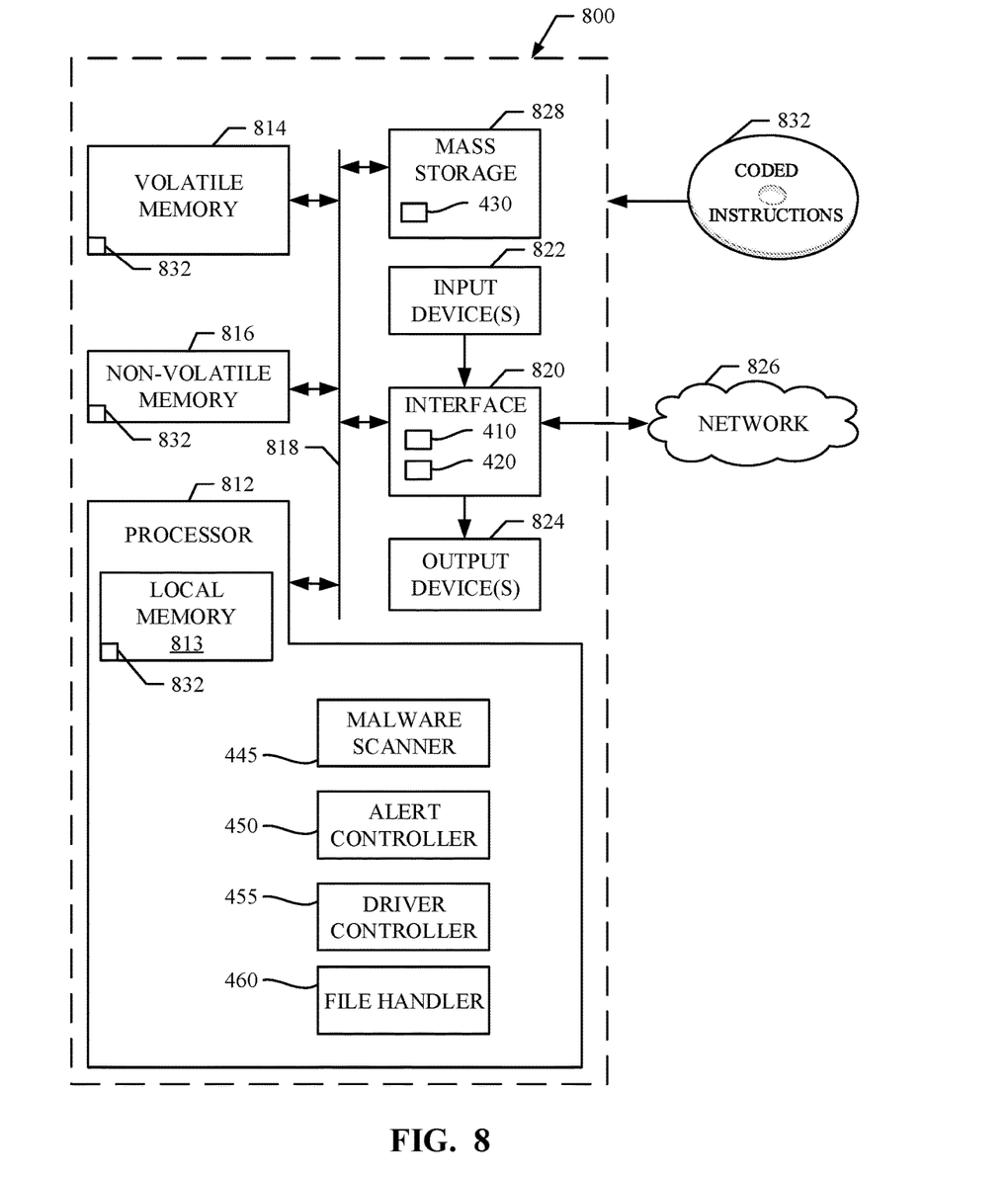
FIG. 8 is a block diagram of an example processing platform structured to execute the instructions of FIGS. 6 and/or 7 to implement the example security system of FIGS. 3, 4, and/or 5.

FIG. 8 is a block diagram of an example processor platform 800 structured to execute the instructions of FIGS. 6 and/or 7 to implement the security system 210 of FIGS. 2, 3, 4, and/or 5. The processor platform 800 can be, for example, a smartphone accessory, a server, a personal computer, a mobile device (e.g., a cell phone, a smart phone, a tablet such as an iPad™), a personal digital assistant (PDA), or any other type of computing device.

The processor platform 800 of the illustrated example includes a processor 812. The processor 812 of the illustrated example is hardware. For example, the processor 812 can be implemented by one or more integrated circuits, logic circuits, microprocessors or controllers from any desired family or manufacturer. The hardware processor may be a semiconductor based (e.g., silicon based) device. In this example, the processor 812 implements the example malware scanner 445, the example alert controller 450, the example driver controller 455, and/or the example file handler 460.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), and/or a PCI express interface. The example interface 820 may implement the example mobile device interface 410 and/or the example external electronic device interface 420.

In the illustrated example, one or more input devices 822 are connected to the interface circuit 820. The input device(s) 822 permit(s) a user to enter data and/or commands into the processor 812. The input device(s) can be implemented by, for example, an audio sensor, a microphone, a camera (still or video), a keyboard, a button, a mouse, a touchscreen, a track-pad, a trackball, isopoint, and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 820 of the illustrated example, thus, typically includes a graphics driver card, a graphics driver chip and/or a graphics driver processor.

The interface circuit 820 of the illustrated example also includes a communication device such as a transmitter, a receiver, a transceiver, a modem and/or network interface card to facilitate exchange of data with external machines (e.g., computing devices of any kind) via a network 826 (e.g., an Ethernet connection, a digital subscriber line (DSL), a telephone line, coaxial cable, a cellular telephone system, etc.).

The processor platform 800 of the illustrated example also includes one or more mass storage devices 828 for storing software and/or data. Examples of such mass storage devices 828 include floppy disk drives, hard drive disks, compact disk drives, Blu-ray disk drives, RAID systems, and digital versatile disk (DVD) drives. The example mass storage 828 of the illustrated example of FIG. 8 implements the example secure storage 430.

The coded instructions 832 of FIGS. 6 and/or 7 may be stored in the mass storage device 828, in the volatile memory 814, in the non-volatile memory 816, and/or on a removable tangible computer readable storage medium such as a CD or DVD.

From the foregoing, it will be appreciated that example methods, apparatus, and articles of manufacture have been disclosed that enable mobile device security through a hardware accessory that acts as an intermediary between a mobile device and an external electronic device (e.g., desktop computer, a USB charging station, a game controller, a flash drive, a memory card, etc.). The disclosed examples enable, many different makes and/or models of mobile devices to be protected from malware without requiring a manufacturer of a mobile device to include security and/or requiring a user to install security software. Moreover, when such an approach is utilized, the need for on-device anti-virus and/or anti-malware to be installed on a mobile device is reduced, thereby freeing the computing resources of the mobile device to perform their intended functions, instead of anti-virus and/or anti-malware activities. Disclosed examples also enable provision of anti-malware protection as an after-market product. Moreover, such examples provide this protection while also providing damage protection in the event of a fall or drop event by providing the intermediary as a case to house (e.g., physically protect) the mobile device.

Example 1 includes an apparatus to secure a mobile device, the apparatus including a housing dimensioned to receive the mobile device, a secure storage carried by the housing, a malware scanner carried by the housing, the malware scanner to perform a first scan of an external electronic device to detect malware on the external electronic device, a driver loader carried by the housing, the driver loader to mount a secure file transfer driver in response to the first scan not identifying malware on the external electronic device, and a file handler carried by the housing, the file handler to detect, using the secure file transfer driver, a file to be transferred intermediate the external electronic device and the mobile device, the malware scanner to scan the file to be transferred, the file handler to quarantine the file in the secure storage in response to the malware scanner detecting malware in the file.

Example 2 includes the apparatus of example 1, wherein the file handler is to communicate with the mobile device using an interface of the mobile device.

Example 3 includes the apparatus of example 1, further including an alert controller to provide an alert to a user of the mobile device in response to the malware scanner detecting malware on the external electronic device.

Example 4 includes the apparatus of example 1, wherein the driver loader is further to mount the external electronic device as a read-only device in response to the malware scanner determining that the external electronic device includes malware.

Example 5 includes the apparatus of example 1, wherein to perform the first scan of the external electronic device, the malware scanner is to interact with an environment sanitization driver executed at the external electronic device.

Example 6 includes the apparatus of example 5, wherein to perform the first scan of the external electronic device, the malware scanner is to scan active processes executed by the external electronic device.

Example 7 includes the apparatus of example 1, wherein the file handler is to store the file to be transferred in the secure storage, and the malware scanner is to perform the scan of the file while the file is stored in the secure storage.

Example 8 includes the apparatus of example 7, wherein, in response to the malware scanner determining that the file does not include malware, the file hander is to transfer the file to a destination, and remove the file from the secure storage.

Example 9 includes the apparatus of example 1, further including a first battery separate from a second battery of the mobile device, the first battery carried by the housing.

Example 10 includes the apparatus of example 1, further including a first display separate from a second display of the mobile device, the first display carried by the housing.

Example 11 includes the apparatus of example 1, further including a first wireless radio separate from a second wireless radio of the mobile device, the first wireless radio carried by the housing.

Example 12 includes at least one non-transitory machine-readable medium comprising instructions which, when executed, cause a processor of a case to receive a mobile device housing to at least perform a first scan of an external electronic device to detect malware on the external electronic device, when the external electronic device does not include malware, mount a secure file transfer driver at the external electronic device, detect, while the secure file transfer driver is mounted, a file to be transferred between the external electronic device and the mobile device, perform a second scan of the file for malware while the file is stored in a secure storage intermediate the external electronic device and the mobile device, and when malware is present in the file, quarantine the file on the secure storage.

Example 13 includes the at least one non-transitory machine-readable medium of example 12, wherein the instructions, when executed, further cause the processor to alert, the user of the mobile device when the malware is present in the file.

Example 14 includes the at least one non-transitory machine-readable medium of example 13, wherein the instructions, when executed, further cause the processor to mount, the external electronic device as a read-only device when the first scan detects the malware.

Example 15 includes the at least one non-transitory machine-readable medium of example 12, wherein the instructions cause the processor to perform the first scan of the external electronic device by interacting with an environment sanitization driver executed at the external electronic device.

Example 16 includes the at least one non-transitory machine-readable medium of example 15, wherein the instructions, when executed, further cause the processor to attempt to install the environment sanitization driver at the external electronic device.

Example 17 includes the at least one non-transitory machine-readable medium of example 15, wherein the instructions cause the processor to perform the first scan of the external electronic device by scanning active processes executed by the external electronic device.

Example 18 includes the at least one non-transitory machine-readable medium of example 12, wherein instructions cause the processor to perform the second scan by storing the file in the secure storage and scanning the file while the file is stored in the secure storage.

Example 19 includes the at least one non-transitory machine-readable medium of example 18, wherein the instructions, when executed, further cause the processor to, in response to not detecting malware within the file transfer the file to a destination, and remove the file from the secure storage.

Example 20 includes a method to secure a mobile device, the method including performing, by executing an instruction with a processor within a housing separate from the mobile device, a first scan of an external electronic device to detect malware on the external electronic device, in response to determining that the external electronic device does not include malware, mounting a secure file transfer driver at the external electronic device, detecting, by executing an instruction with a processor, while the secure file transfer driver is mounted, a file to be transferred intermediate the external electronic device and the mobile device, performing, by executing an instruction with the processor, a second scan of the file for malware, and in response to detecting malware within the file, quarantining the file on a secure storage.

Example 21 includes the method of example 20, further including alerting, in response to determining that the external electronic device includes malware, the user of the mobile device.

Example 22 includes the method of example 21, further including mounting, in response to determining that the external electronic device includes malware, the external electronic device as a read-only device.

Example 23 includes the method of example 20, wherein the first scan of the external electronic device is performed by interacting with an environment sanitization driver executed at the external electronic device.

Example 24 includes the method of example 23, further including attempting to install the environment sanitization driver at the external electronic device.

Example 25 includes the method of example 23, wherein the first scan of the external electronic device includes scanning active processes executed by the external electronic device.

Example 26 includes the method of example 20, wherein the performing of the second scan includes storing the file in the secure storage and scanning the file while the file is stored in the secure storage.

Example 27 includes the method of example 26, further including in response to not detecting malware within the file transferring the file to a destination, and removing the file from the secure storage.

Example 28 includes an apparatus to secure a mobile device, the apparatus including first means for scanning an external electronic device to detect malware on the external electronic device, means for mounting, in response to determining that the external electronic device does not include malware, a secure file transfer driver at the external electronic device, means for detecting, while the secure file transfer driver is mounted, a file to be transferred intermediate the external electronic device and the mobile device, second means for scanning a second scan of the file for malware, and means for quarantining, in response to detecting malware within the file, the file on a secure storage.

Example 29 includes the apparatus of example 28, further including means for alerting, in response to determining that the external electronic device includes malware, the user of the mobile device.

Example 30 includes the apparatus of example 29, wherein the means for mounting is further to mount, in response to determining that the external electronic device includes malware, the external electronic device as a read-only device.

Example 31 includes the apparatus of example 28, wherein the first means for scanning is to interact with an environment sanitization driver executed at the external electronic device.

Example 32 includes the apparatus of example 31, wherein the means for mounting is further to attempt to install the environment sanitization driver at the external electronic device.

Example 33 includes the apparatus of example 31, wherein the first means for scanning is to scan active processes executed by the external electronic device.

Example 34 includes the apparatus of example 28, wherein the second means for scanning is to store the file in the secure storage and scan the file while the file is stored in the secure storage.

Example 35 includes the apparatus of example 34, further including file handling means for, in response to not detecting malware within the file transferring the file to a destination, and removing the file from the secure storage.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to secure a mobile device, the apparatus comprising:
    a mobile device case dimensioned to at least partially house the mobile device;
    a secure storage carried by the mobile device case;
    a malware scanner carried by the mobile device case, the malware scanner to perform a first scan of an external electronic device to detect malware on the external electronic device;
    a driver loader carried by the mobile device case, the driver loader to mount a secure file transfer driver in response to the first scan not identifying malware on the external electronic device; and
    a file handler carried by the mobile device case, the file handler to detect, using the secure file transfer driver, a file to be transferred intermediate the external electronic device and the mobile device, the malware scanner to scan the file to be transferred, the file handler to quarantine the file in the secure storage in response to the malware scanner detecting malware in the file.

2. The apparatus of claim 1, wherein the file handler is to communicate with the mobile device using an interface of the mobile device.

3. The apparatus of claim 1, further including an alert controller to provide an alert to a user of the mobile device in response to the malware scanner detecting malware on the external electronic device.

4. The apparatus of claim 1, wherein the driver loader is further to mount the external electronic device as a read-only device in response to the malware scanner determining that the external electronic device includes malware.

5. The apparatus of claim 1, wherein to perform the first scan of the external electronic device, the malware scanner is to interact with an environment sanitization driver executed at the external electronic device.

6. The apparatus of claim 5, wherein to perform the first scan of the external electronic device, the malware scanner is to scan active processes executed by the external electronic device.

7. The apparatus of claim 1, wherein the file handler is to store the file to be transferred in the secure storage, and the malware scanner is to perform the scan of the file while the file is stored in the secure storage.

8. The apparatus of claim 7, wherein, in response to the malware scanner determining that the file does not include malware, the file hander is to
    transfer the file to a destination; and
    remove the file from the secure storage.

9. The apparatus of claim 1, further including a first battery separate from a second battery of the mobile device, the first battery carried by the mobile device case.

10. The apparatus of claim 1, further including a first display separate from a second display of the mobile device, the first display carried by the mobile device case.

11. The apparatus of claim 1, further including a first wireless radio separate from a second wireless radio of the mobile device, the first wireless radio carried by the mobile device case.

12. At least one non-transitory machine-readable medium comprising instructions which, when executed, cause a processor of a mobile device case to receive a mobile device to at least:
    perform a first scan of an external electronic device to detect malware on the external electronic device;
    when the external electronic device does not include malware, mount a secure file transfer driver at the external electronic device;
    detect, while the secure file transfer driver is mounted, a file to be transferred between the external electronic device and the mobile device;
    perform a second scan of the file for malware while the file is stored in a secure storage intermediate the external electronic device and the mobile device; and
    when malware is present in the file, quarantine the file on the secure storage.

13. The at least one non-transitory machine-readable medium of claim 12, wherein the instructions, when executed, further cause the processor to alert the user of the mobile device when the malware is present in the file.

14. The at least one non-transitory machine-readable medium of claim 13, wherein the instructions, when executed, further cause the processor to mount the external electronic device as a read-only device when the first scan detects the malware.

15. The at least one non-transitory machine-readable medium of claim 12, wherein the instructions, when executed, cause the processor to perform the first scan of the external electronic device by interacting with an environment sanitization driver executed at the external electronic device.

16. The at least one non-transitory machine-readable medium of claim 15, wherein the instructions, when executed, further cause the processor to attempt to install the environment sanitization driver at the external electronic device.

17. The at least one non-transitory machine-readable medium of claim 15, wherein the instructions, when executed, cause the processor to perform the first scan of the external electronic device by scanning active processes executed by the external electronic device.

18. The at least one non-transitory machine-readable medium of claim 12, wherein instructions, when executed, cause the processor to perform the second scan by storing the file in the secure storage and scanning the file while the file is stored in the secure storage.

19. The at least one non-transitory machine-readable medium of claim 18, wherein the instructions, when executed, further cause the processor to, in response to not detecting malware within the file:
    transfer the file to a destination; and
    remove the file from the secure storage.

20. A method to secure a mobile device, the method comprising:
    performing, by executing an instruction with a processor within a mobile device case separate from the mobile device, a first scan of an external electronic device to detect malware on the external electronic device, the mobile device case dimensioned to at least partially house the mobile device;
    in response to determining that the external electronic device does not include malware, mounting a secure file transfer driver at the external electronic device;
    detecting, by executing an instruction with the processor, while the secure file transfer driver is mounted, a file to be transferred intermediate the external electronic device and the mobile device;
    performing, by executing an instruction with the processor, a second scan of the file for malware; and
    in response to detecting malware within the file, quarantining the file on a secure storage.

21. The method of claim 20, further including alerting, in response to determining that the external electronic device includes malware, the user of the mobile device.

22. The method of claim 21, further including mounting, in response to determining that the external electronic device includes malware, the external electronic device as a read-only device.

23. The method of claim 20, wherein the first scan of the external electronic device is performed by interacting with an environment sanitization driver executed at the external electronic device.

24. The method of claim 23, further including attempting to install the environment sanitization driver at the external electronic device.

25. The method of claim 23, wherein the first scan of the external electronic device includes scanning active processes executed by the external electronic device.

26. The method of claim 25, further including in response to not detecting malware within the file:
    transferring the file to a destination; and
    removing the file from the secure storage.

27. The method of claim 20, wherein the performing of the second scan includes storing the file in the secure storage and scanning the file while the file is stored in the secure storage.

28. An apparatus to secure a mobile device, the apparatus including:
    a mobile device case dimensioned to at least partially house the mobile device;
    first means for scanning an external electronic device to detect malware on the external electronic device;
    means for mounting, in response to determining that the external electronic device does not include malware, a secure file transfer driver at the external electronic device;
    means for detecting, while the secure file transfer driver is mounted, a file to be transferred intermediate the external electronic device and the mobile device;
    second means for scanning a second scan of the file for malware; and
    means for quarantining, in response to detecting malware within the file, the file on a secure storage.

29. The apparatus of claim 28, further including means for alerting, in response to determining that the external electronic device includes malware, the user of the mobile device.

30. The apparatus of claim 29, wherein the means for mounting is further to mount, in response to determining that the external electronic device includes malware, the external electronic device as a read-only device.

31. The apparatus of claim 28, wherein the first means for scanning is to interact with an environment sanitization driver executed at the external electronic device.

32. The apparatus of claim 31, wherein the means for mounting is further to attempt to install the environment sanitization driver at the external electronic device.

33. The apparatus of claim 31, wherein the first means for scanning is to scan active processes executed by the external electronic device.

34. The apparatus of claim 28, wherein the second means for scanning is to store the file in the secure storage and scan the file while the file is stored in the secure storage.

35. The apparatus of claim 34, further including file handling means for, in response to not detecting malware within the file:
    transferring the file to a destination; and
    removing the file from the secure storage.

* * * * *